United States Patent [19]
Shibata

[11] Patent Number: 5,416,477
[45] Date of Patent: May 16, 1995

[54] NAVIGATION SYSTEM MOUNTED ON VEHICLE

[75] Inventor: Akihito Shibata, Yokohama, Japan

[73] Assignee: Matsushita Electric Industrial Co., Ltd., Osaka, Japan

[21] Appl. No.: 19,312

[22] Filed: Feb. 18, 1993

Related U.S. Application Data

[63] Continuation-in-part of Ser. No. 785,019, Oct. 30, 1991, abandoned.

[30] Foreign Application Priority Data

Nov. 6, 1990 [JP] Japan .................................. 2-301985

[51] Int. Cl.⁶ ............................................. G08G 1/123
[52] U.S. Cl. ..................................... 340/988; 340/990; 340/995; 364/443; 364/449; 364/454
[58] Field of Search ...................... 340/988, 990, 995; 364/443, 449, 453, 454

[56] References Cited

U.S. PATENT DOCUMENTS

| | | | |
|---|---|---|---|
| 4,737,916 | 4/1988 | Ogawa et al. | 340/990 |
| 4,763,270 | 8/1988 | Itoh et al. | 340/990 |
| 4,939,662 | 7/1990 | Nimura et al. | 340/990 |
| 4,963,864 | 10/1990 | Iihoshi et al. | 340/990 |
| 4,963,865 | 10/1990 | Ichikawa et al. | 340/990 |
| 5,031,104 | 7/1991 | Ikeda et al. | 340/990 |
| 5,041,983 | 8/1991 | Nakahara et al. | 340/990 |
| 5,046,011 | 9/1991 | Kakihara et al. | 340/990 |
| 5,109,344 | 4/1992 | Kakihara et al. | 340/990 |

*Primary Examiner*—Donnie L. Crosland
*Attorney, Agent, or Firm*—Stevens, Davis, Miller & Mosher

[57] ABSTRACT

The navigation system includes sensors for detecting a condition of a vehicle's movement, an imaginary location calculating device for calculating an existence location of the vehicle, a straight condition processing device for judging whether or not the vehicle is traveling straight, thereby forming a straight travel locus in a condition of straight travel, map data, a road searching-straightening processing device for extracting information concerning a road so as to form a locus as a straight road, a direction rectifying data calculating device for producing a direction offset by calculating direction errors, a location rectifying data calculating device for calculating a location offset, and a location direction rectifying device for rectifying a location and direction of the vehicle by respectively providing a direction offset and location offset with respect to an estimated direction and an estimated location.

29 Claims, 8 Drawing Sheets

CO-ORDINATE OF $V_{ijk}:(X_{ijk}, Y_{ijk})$
IMAGINARY LOCUS: $T = \overline{T_1 T_2 T_3}$
IMAGINARY ROUTE: $R_{ijk} = \overline{R_{1i} R_{2j} R_{3k}}$ F I G. 6
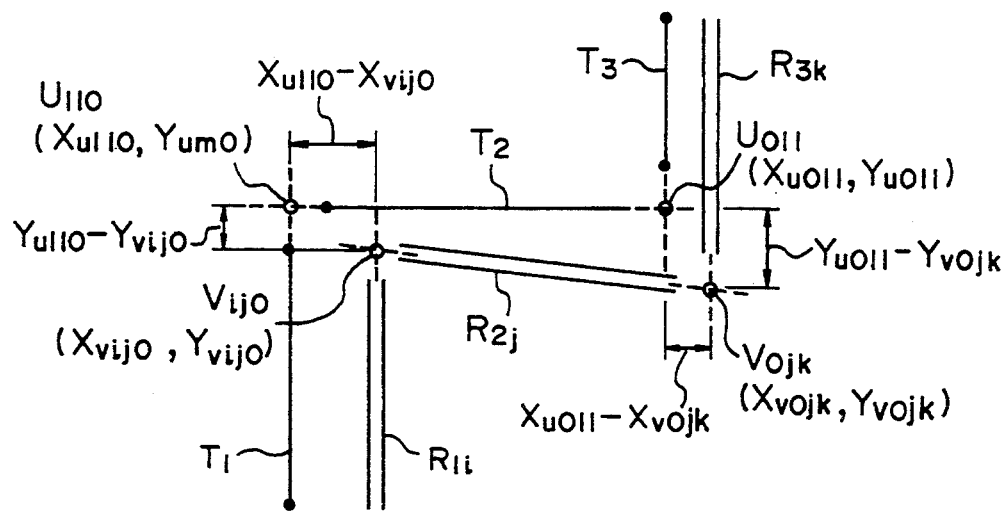
F I G. 7
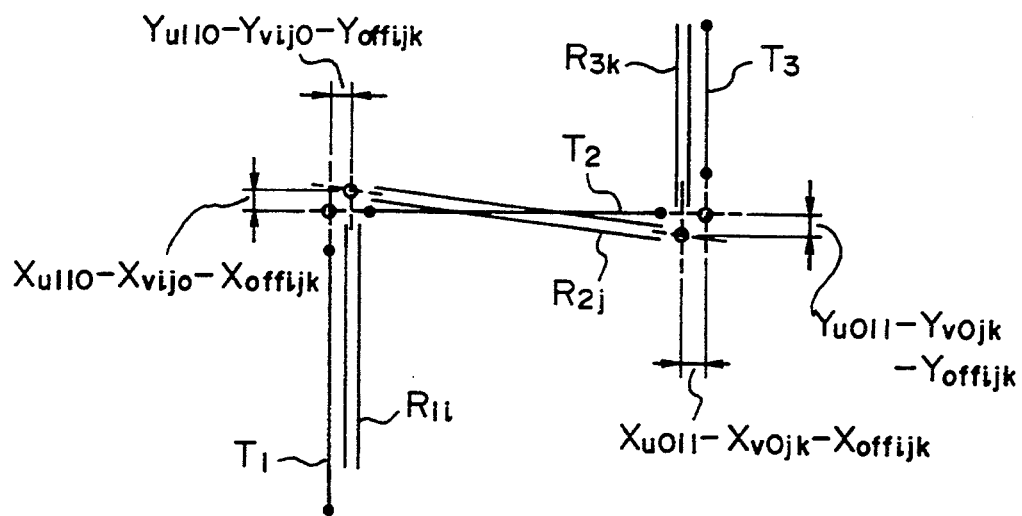

NAVIGATION SYSTEM MOUNTED ON VEHICLE

CROSS-REFERENCE TO RELATED APPLICATION

This is a continuation in part of U.S. Pat. application Ser. No. 07/785,019, filed on Oct. 30, 1991, now abandoned.

BACKGROUND OF THE INVENTION

This invention relates to a navigation system mounted on a vehicle for displaying a location and direction of a vehicle, map information of the area around the vehicle and so on.

DESCRIPTION OF THE PRIOR ART

In a conventional navigation system mounted on a vehicle of the type described above data concerning any road, having a small direction difference with respect to a straight travel, is searched from data of travel of a vehicle. If the search locates only one road this road is selected as a vehicle travel route, and the vehicle location is rectified to this road. Also, the direction of the vehicle is rectified so that the direction of the detected straight travel can represented as a road direction.

Such a navigation system will be hereinafter described with reference to the drawings. FIG. 10 shows a structure of the conventional navigation system mounted on a vehicle, and FIG. 11 is an operation illustration of the navigation system.

In FIGS. 10 and 11, a sensor 410 separately includes a velocity sensor 411 and an angular sensor 412. The velocity sensor 411 detects a velocity of the vehicle, while the angular sensor 412 detects a direction (traveling direction) of the vehicle. An estimated location-direction calculating means 431 estimates a present location thereof on the basis of data obtained from the sensor 410. That is, the velocity sensor 411 is provided for detecting the velocity of the vehicle and the angular sensor 412 for detecting the direction of the vehicle. As concretely shown in FIG. 11, an estimated location of the vehicle is found by adding a travel distance 511 obtained from the velocity sensor 411 to that of the previous location 512, and further an estimated direction 523 is decided by adding a changed angle 521 obtained from the angular sensor 412 to that of the previous direction 522.

Next, a nominated road calculating means 432 calculates a nominated road, where a vehicle is considered to travel, from map data 421 of an auxiliary storing means 420 on the basis of data of the estimated location-direction calculating means 431. And, a location-direction rectifying means 433 decides a present location and a present direction of the vehicle by the nominated road provided by the nominated road calculating means 432 (531 and 532 in FIG. 11), and rectifies the location and direction of the data obtained from the estimated location-direction calculating means 431, thereby setting the present location on the nominated road of the map data 421. And, the present location obtained from a result of calculating of these means can be displayed with the map data 421 on a display means 440.

In the above conventional navigation system, however, when the vehicle travels in an area having many roads, such as an urban district, there may be a plurality of roads in the estimated existence area of the vehicle. In this case, since there is not only one located road, the location rectification and the direction rectification can not be made, and the location errors in the travel direction of the vehicle are accumulated. Therefore, the estimated existence area becomes large, and as a result the present location and the present direction of the vehicle are not located, which results in a problem that the vehicle may travel astray.

Referring to another problem, the road data are not always accurate, and therefore when only one road is selected, the location rectification and the direction rectification may be made with respect to a wrong road, in which case the correct road can not be recovered thereafter, so that the present location and the present direction of the vehicle are not located.

SUMMARY OF THE INVENTION

The present invention can resolve the above problems of the prior art. It is an object of this invention to provide a navigation system mounted on a vehicle which can accurately calculate the present location and the present direction of the vehicle.

In order to achieve the above object of the present invention, a navigation system mounted on a vehicle comprises estimated location-direction calculating means for calculating a vehicle existence location on the basis of information of said vehicle's movement, straight condition processing means for judging by said information of the vehicle's movement whether or not the vehicle is in a condition of straight travel and for forming a straight travel locus in the condition of straight travel, road searching-straightening processing means for estimating and extracting a road which exists in map data therefrom and from the estimated location-direction calculating means to thereby form a locus as a straight road, direction rectifying data calculating means for finding a direction offset by calculating direction errors on the basis of imaginary loci connected to a plurality of straight travel loci when those loci are obtained and imaginary routes obtained by selecting one by one a straight road corresponding to the respective straight travel locus, thereby calculating direction unconformity degree using each one of the direction errors of straight roads still remaining after this direction offset is removed from the imaginary routes, location rectifying data calculating means for finding as a location offset a location error of a turning point of an imaginary route with respect to a turning point of a imaginary locus when an intersection of the straight travel locus which forms the imaginary locus is calculated as a turning point of the imaginary locus and an intersection of the straight road which forms an imaginary route and removes said direction offset is calculated as a turning point of the imaginary route, thereby calculating a location unconformity degree on the basis of a difference of each location of the imaginary routes still remaining after location offsets of the imaginary loci are removed, and location-direction rectifying means for rectifying a location-direction of the vehicle by respectively giving a direction offset and a location offset with respect to an imaginary direction and an imaginary location when said direction unconformity degree and said location unconformity degree respectively are within a predetermined threshold value.

Thus, according to the present invention, the imaginary locus is formed by connecting straight travel loci detected from the travel data of the vehicle with each other over a plurality of vectors of the straight travel loci. The imaginary route is formed by connecting straight roads with each other over a plurality of vectors of those roads, wherein the straight roads are searched from the estimated present existence area of the vehicle when the straight travel of the vehicle is detected. Then, it is possible to compare a pattern of the locus with that of the route over a long distance by finding a location unconformity degree and a direction unconformity degree after the direction offset and the location offset are removed from them, so that a correct traveling road can be found with a high probability even when the vehicle travels at the area where roads concentrate, such as an urban district. It can be prevented that the present location and the present direction of the vehicle are not located, thereby allowing the vehicle to travel astray. Further, the travel route is determined in accordance with the result of comparison between the patterns of the plurality of vectors. Therefore, even if the road map data is partially wrong, the navigation system of the present invention is less affected by such wrong data, so that the present location and the present direction of the vehicle can be accurately found with a high probability.

BRIEF DESCRIPTION OF THE DRAWINGS

FIG. 6 is a view showing the manner of finding a location offsets of the imaginary locus and the imaginary route;

FIG. 7 is a view showing the manner of finding the direction unconformity degree;

DESCRIPTION OF THE PREFERRED EMBODIMENT

Figure 1:
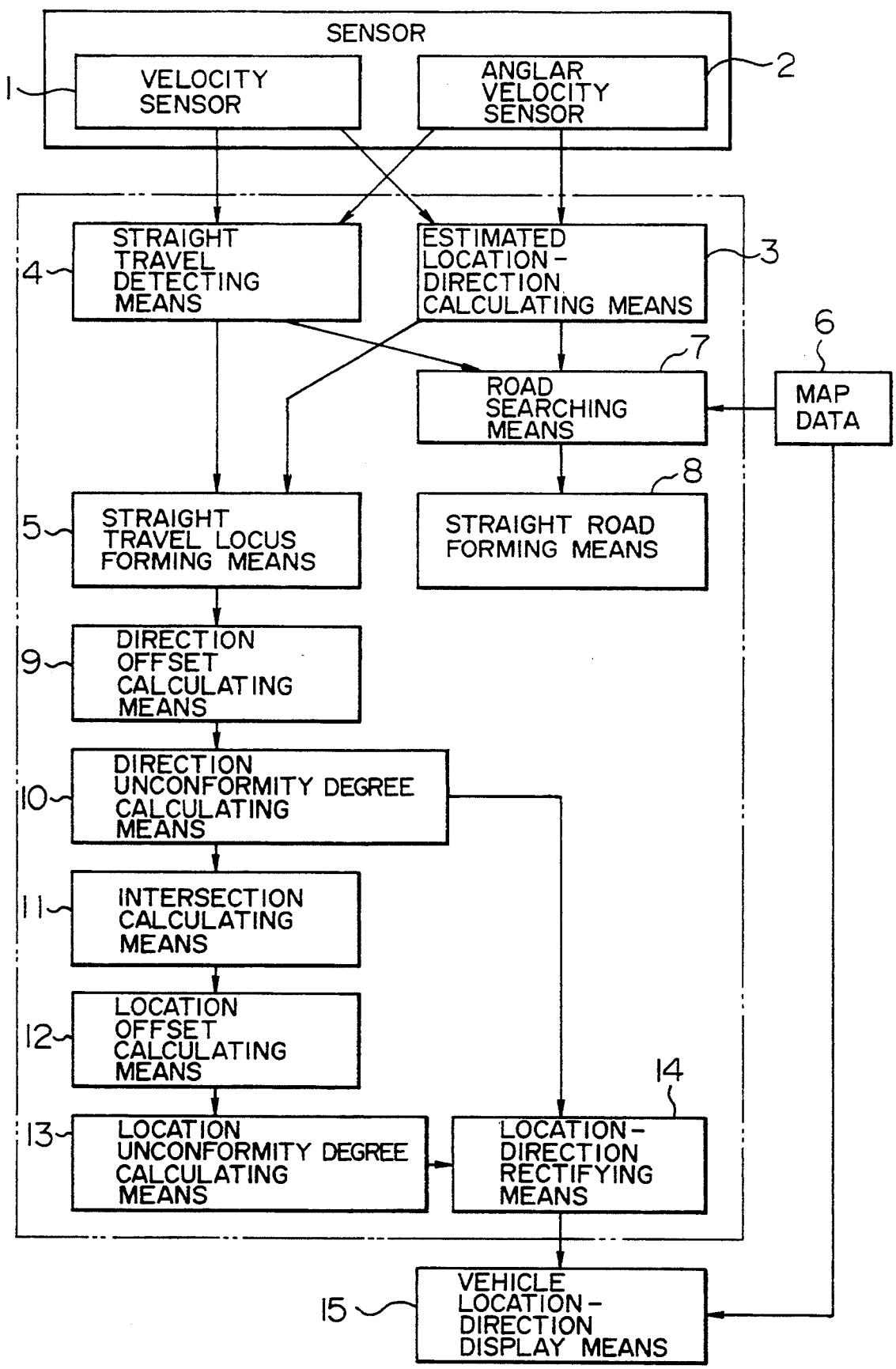
FIG. 1 is a schematic block diagram of a navigation system mounted on a vehicle according to an embodiment of the present invention.

FIG. 1 shows one embodiment of the present invention.

In FIG. 1, a numeral 1 denotes a velocity sensor for detecting a travel velocity of a vehicle, and the numeral 2 denotes an angular sensor for detecting a rotation angle velocity of the vehicle. There are many cases where a vehicle velocity pulse detector is used as the velocity sensor and an optical fiber gyro as the angular sensor, and so on.

Ordinarily, a travel distance of a vehicle is found by integrating output values of the velocity sensor, and the rotation angle of the vehicle is found by integrating output values of the angle sensor.

A numeral 3 denotes estimated location-direction calculating means in which an estimated present location and an estimated present direction of the vehicle are calculated by adding moving vectors of the vehicle obtained from the output values of the velocity sensor and angular velocity sensor to a previous location and a previous direction of the vehicle.

A numeral 4 denotes straight travel detecting means for detecting a condition of a vehicle straightly traveling, and a numeral 5 denotes straight travel locus forming means for forming one straight travel locus by connecting moving vectors with each other during proceeding of the vehicle straightly traveling.

A numeral 6 denotes map data which store information of a network of roads and are generally recorded in CD-ROM and the like.

A numeral 7 denotes road searching means for searching from the map data a road having the direction near to an estimated direction in the neighborhood of an estimated location in which the condition of the vehicle straightly traveling is detected, and numeral 8 denotes straight road forming means for forming a straight road parallel to a straight travel locus by connecting the searched roads with each other.

A numeral 9 denotes direction offset calculating means for forming an imaginary locus by connecting a plurality of straight travel loci when those loci are obtained and an imaginary route by selecting one by one straight roads corresponding to every straight travel locus, thereby calculating a mean value of direction differences of the straight travel loci and the straight roads as a direction offset of the imaginary route with respect to the imaginary loci.

A numeral 10 denotes direction unconformity degree calculating means for calculating as a direction unconformity degree a mean value of absolute values of direction differences in each of the straight roads still remaining after direction offsets of the imaginary routes are removed, and a numeral 11 denotes intersection calculating means for calculating an intersection of the straight travel loci included in the imaginary locus as a turning point of the imaginary locus and for calculating an intersection of a straight road included in the imaginary route, from which the direction offsets are removed, as a turning point of the imaginary route.

A numeral 12 denotes location offset calculating means for calculating a mean value of respective differences between the X-co-ordinate and the Y-co-ordinate of the turning points of the imaginary locus and the imaginary route as a location offset of the imaginary route with respect to the imaginary locus, a numeral 13 location unconformity degree calculating means for calculating as a location unconformity degree a mean value of absolute values of respective difference of X-co-ordinate and Y-co-ordinate of turning points still remaining after the location offsets of the imaginary routes are removed, and a numeral 14 location-direction rectification means for judging high the possibility of a route that a vehicle practically travels in a case of direction unconformity degree and location unconformity degree of the imaginary routes each being less than a predetermined threshold value, thereby rectifying a direction add location of a vehicle by providing a rotation corresponding to the direction offset to an estimated direction of the vehicle and a parallel movement corresponding to the location offset to an estimated location of the vehicle.

A numeral 15 denotes vehicle location-direction display means for displaying the rectified location and the rectified direction of the vehicle and map for forming a background. This display means 15 generally includes an image memory, an illustration processor, CRT display and the like.

Next, an operation of the above embodiment will be described with reference to the drawings.

Figure 2:
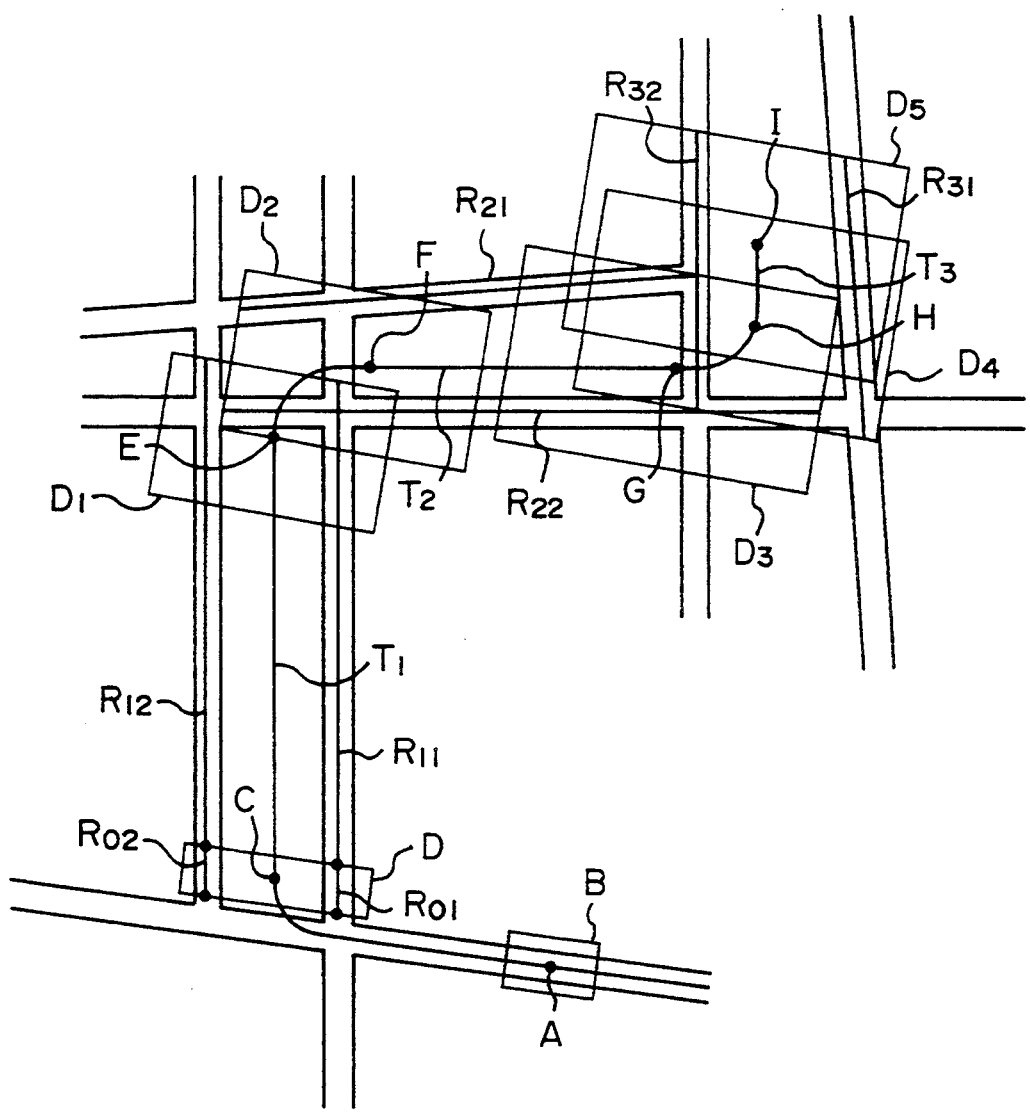
FIGS. 2 and 3 are views showing a travel locus of a vehicle, a road around the vehicle, and the manner of finding an imaginary locus and an imaginary route for rectifying a location and a direction of the vehicle.

In FIG. 2, a vehicle firstly exists at a point A, and an existence estimated area of the vehicle at the time is expressed as B. This estimated existence area expresses a vehicle's location error generally generated by errors of a velocity sensor, an angle velocity sensor and map data as an "area of a vehicle capable of existing". Ordinarily, a component of a travel direction of the vehicle in the estimated existence area is increased by errors of the velocity sensor, while a component of direction perpendicular to a travel direction of the vehicle is increased by errors of the angular velocity sensor. When the location of the vehicle is rectified to a road of the map data and by using G P S (Global Positioning System) and the like, an accuracy of the vehicle's location is made high, so that the estimated existence area is reduced.

The estimated location-direction calculating means 3 calculates an estimated present location and an estimated present direction of the vehicle by adding traveling vectors of the vehicle obtained from output values of the velocity sensor 1 and the angular velocity sensor 2 to the previous location and the previous direction of the vehicle. In this case, when an output value of the velocity is d1, an output value of the angle velocity $d\theta$, a previous direction of the vehicle $\theta n-1$, and a previous location of the vehicle $(Xn-1, Yn-1)$, an estimated present direction $\theta n$ and an estimated present location $(Xn, Yn)$ are generally expressed with the following equation.

$$\theta n = \theta n - 1 + d\theta$$

$$Xn = Xn - 1 + dl\cos\theta n$$

$$Yn = Yn - 1 + dl\sin\theta n$$

The straight travel detection means 4 detects a condition of the vehicle straightly traveling at the same time when the estimated location and the estimated direction of the vehicle are calculated. It is recognized as a general method or a simple method performed for instruments mounted on a vehicle that the detection of the condition of the vehicle straightly traveling is effected by judging the fact that the direction change in a range of more than a predetermined constant distance is contained within a predetermined constant angle. When the travel distance of the vehicle from a certain point is set as $\Sigma dl$, a direction change amount of the vehicle as $\Sigma d\theta$, a threshold value of the distance as $l0$, and a threshold value of an angle as $\theta 0$, there is determined a straight travel condition at the time when both the following equations are held.

$$\Sigma dl \geq l0$$

$$\Sigma d\theta \geq \theta 0$$

(Ordinary, when $\Sigma d\theta$ increases over the threshold value $\theta 0$, $\Sigma dl$ and $\Sigma d\theta$ are cleared, thereby preparing to detect a condition of the vehicle straightly traveling.)

Figure 3:
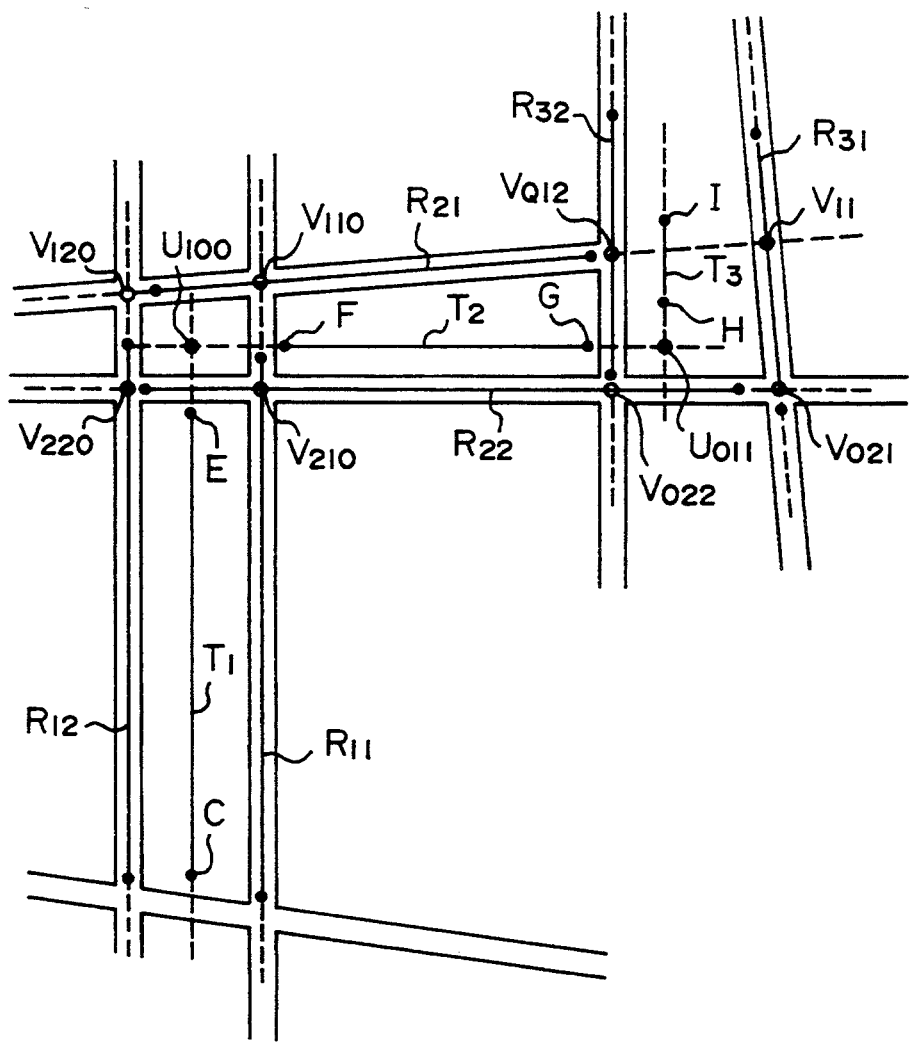

Further, in FIG. 3, the vehicle proceeds the condition of the straight travel by the time of arriving at a E point through a C point thereon. Then, the straight locus forming means 5 forms one straight travel locus T1 by connecting traveling vectors with each other in every distance threshold 10 accumulated during that time. In this time, the road searching means 7 searches roads R01 and R02 whose directions are near to the direction of the vehicle from the road data included in the estimated existence area D in the map data 6, and further the straight road forming means 8 forms roads R11 and R12 by mutually connecting the roads searched by the time when the vehicle arrives at the E point.

In a route of the vehicle passing a turning corner of the road and arriving at a G point through an F point in FIG. 3, the condition of the straight travel proceeds as well. Then, the straight locus forming means 5 forms a straight travel locus T2, and the road searching means 7 and the straight road forming means 8 form straight roads R21 and R22.

And, in a route of the vehicle arriving at a I point through a H point therein, a straight travel locus T3 and straight roads R31 and R32 are formed as well as the above case.

Thus, the vehicle in turn travels through the C point, the E point, the F point, the G point, the H point, and the I point, thereby allowing straight travel loci and straight roads to be accumulated in the system. Then, in the I point where the straight travel loci are formed more than three loci, the straight travel loci T1, T2, T3 and the straight roads R1i, R2j, R3k which are accumulated at this time respectively are connected to each other, thereby forming an imaginary locus T and an imaginary route Rijk.

Next, a direction offset and a location offset of the imaginary locus and the imaginary route are found in each means, and a direct unconformity degree and a location unconformity degree are calculated after those offsets are removed. This provides the imaginary route which makes high the possibility of the vehicle traveling, so that a manner of a direction rectification and a direction rectification of the vehicle will be described as follows.

First, the direction offset and the direction unconfirmity degree are found as hereinafter mentioned.

The direction offset corresponds to a difference between the directions of the straight travel loci T1, T2, T3 for making the imaginary locus T and the straight roads R1i, R2j, R3k for making the imaginary route Rijk, i.e. rotation moving angle. The direction offset is a mean value of the direction differences of the straight travel locus T1 and the straight road R1i, T2 and R2j, and T3 and R3k. This is calculated in the direction offset calculation means 9.

Figure 4:
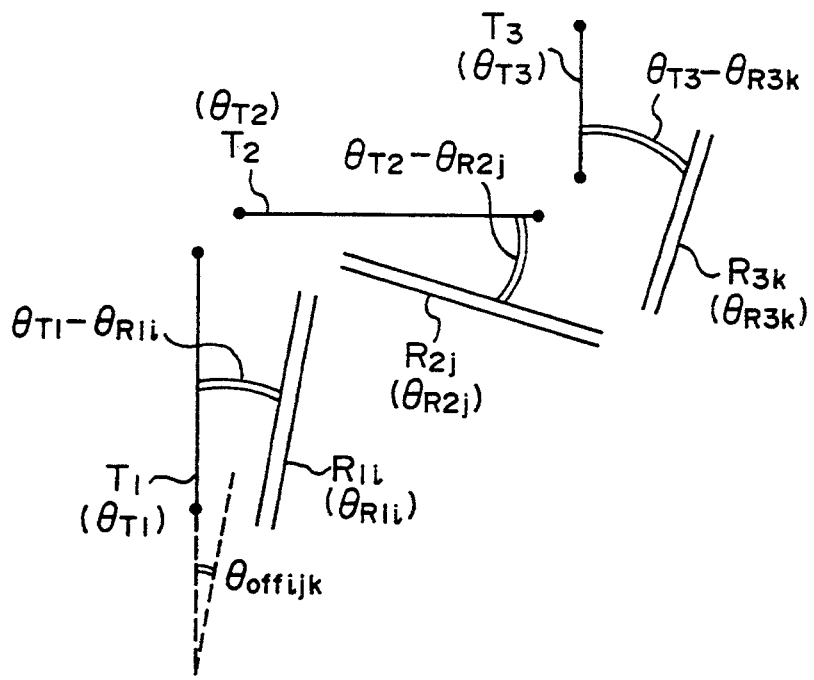
FIG. 4 is a view showing the manner of finding location offsets of the imaginary locus and the imaginary route of the vehicle.

Now, as shown in FIG. 4, if the directions of the straight travel loci T1, T2, T3 each are put as $\theta T1, \theta T2, \theta T3$ and the directions of the straight roads R1i, R2j, R3k each are put as $\theta R1i, \theta R2j, \theta R3k$, a direction offset $\theta offset$ $\theta offijk$ is calculated using the following equation.

$$\theta offijk = ((\theta T1 - \theta R1i) + (\theta T2 - \theta R2j) + (\theta T3 - \theta R3k))/3$$

After this calculation, the direction unconformity degree of the imaginary route is calculated. The direction unconformity degree is a difference of the direction between the straight roads R1i, R2j, R3k and the straight travel loci T1, T2, T3 still remaining after the direction offsets are removed from the directions of the straight roads R1i, R2j, R3k. This direction unconformity degree is calculated by the direction unconformity degree calculation means 10 and corresponds to a mean value of the absolute values in values that the direction offset $\theta$offijk is subtracted from the difference of the directions between the straight travel locus T1 and the straight road R1i, T2 and R2j, and T3 and R3k. This is calculated by the direction unconformity degree calculating means 10.

Figure 5:
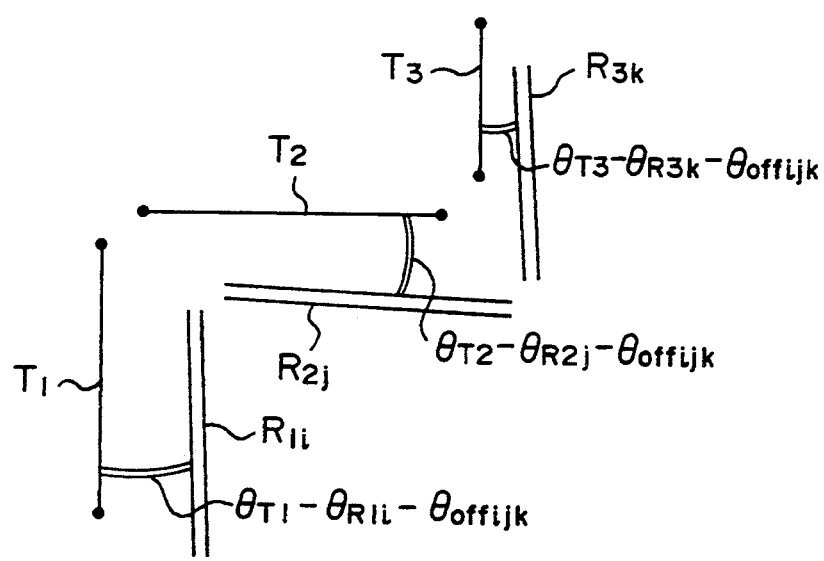
FIG. 5 is a view showing the manner of finding a direction unconformity degree.

In this case, as shown in FIG. 5, if the directions of the straight travel loci T1, T2, T3 each are expressed by $\theta$T1, $\theta$T2, $\theta$T3, the directions of the straight roads each by $\theta$R1i, $\theta$R2j, $\theta$R3k, and the direction offset by $\theta$offijk, the direction unconformity degree F$\theta$ijk is calculated by the following equation. That is:

$$F\theta ijk = (|\theta T1 - \theta R1i - \theta offijk| + |\theta T2 - \theta R2j - \theta offijk| + |\theta T3 - \theta R3k - \theta offijk|)/3$$

The direction unconformity degree F$\theta$ijk expresses the error of the directions in comparison of a configuration of the imaginary locus T with that of the imaginary route Rijk. This expresses to what extent the configuration of the imaginary route is similar to that of the imaginary locus.

Next, the turning point of the imaginary locus, i.e. intersections U110 and U011 of the straight travel loci for making the imaginary locus, and the turning point of the imaginary route from which the direction offsets are removed, i.e. intersections Vij0 and V0jk of the straight roads for making the imaginary route, are found, thereby allowing the location offset and the location unconformity degree to be calculated.

The intersection U110 of the straight travel loci T1 and T2 for making the imaginary locus T and the intersection U0101 of the loci T2 and T3, the intersection Vij0 of the straight roads R1i and R2j for making the imaginary route Rijk from which the direction offset is removed, and the intersection V0jk of the roads R2j and R3k have a co-ordinate corresponding to an intersection of straight lines so as to geometrically easily find them by the intersection calculation means 11.

The location offset corresponds to differences of the locations of the intersections U110 and Vij0 and the intersections U011 and V0jk, i.e. a parallel movement distance. The location offset is separately found in a X-axis direction and a Y-axis direction thereof. This location offset is a mean value of the differences of the X-coordinate and the Y-co-ordinate in the intersections U110 and Vij0, the intersections U011 and V0jk so as to be calculated by the location offset calculating means 12.

Now, as shown in FIG. 6, if the co-ordinate of the intersections U110, U011 of the straight travel loci each are put as (Xu110, Yu110), (Xu011, Yu011), and the coordinate of the intersections Vij0, V0jk of the straight roads each as (Xvij0, Yvij0), (Xv0jk, Yvojk), a X-direction offset Xoffijk and a Y-direction offset Yoffijk are calculated by the following equations. That is:

$$Xoffijk = ((Xu110 - Xvij0) + (Xu011 - Xv0jk))/2$$

$$Yoffijk = ((Yu110 - Yvij0) + (Yu011 - Yv0jk))/2$$

After this calculation, a location unconformity degree of the imaginary route is calculated. The location unconformity degree means a difference of the locations between the intersections Vij0, V0jk of the straight roads and the intersections U110 and U011 of the straight travel loci still remained after the location offsets are removed from the intersections of the straight roads.

The location unconformity degree Fp is calculated by the location unconformity degree calculation means 10 so as to be provided as a square root value of the sum of the squares of a X-direction unconformity degree Fx and Y-direction unconformity degree Fy. The X-direction unconformity degree Fxijk is calculated as a mean value of the absolute value of the value that the X-direction offset Xoffijk is subtracted from the difference of X-co-ordinate of the intersections U110 and Vij0 and the intersections U011 and V0jk. In a similar way, the Y-direction unconformity degree Fyijk is calculated as a mean value of the absolute value of the value that the Y-direction offset Yoffijk is subtracted from the difference of the Y-co-ordinate of the intersections U110 and V110 and the intersections U011 and V0jk.

Now, as shown in FIG. 7, if the co-ordinates of the intersections U110 and U011 of the straight travel loci each are put as (Xu110, Yu110), (Xu011, Yu011), the intersections Vij0, V0jk of the straight roads each are put as (Xvij0, Yvij0), (Xv0jk, Yv0jk), and the X-direction offset is expressed as Xoffijk and the Y-direction offset as Yoffijk, a X-direction unconformity degree Fxijk, a Y-direction unconformity degree Fxijka and a location unconformity degree Fpijk are calculated by the following equation. That is:

$$Fxijk = (|XTij0 - XRij0 - Xoffijk| + |XT0jk - XR0jk - Xoffijk|)/2$$

$$Fyijk = (|YTij0 - YRij - Yoffijk| + |YT0jk - YR0jk - Yoffijk|)/2$$

$$Fpijk = (Fxijk^2 + Fyijk^2)^{\frac{1}{2}}$$

The location unconformity degree Fpijk expresses errors of the locations in comparison of a configuration of the imaginary locus T with that of the imaginary route Rijk. This expresses that as the location locus T is small, the configuration of the imaginary route is similar to that of the imaginary locus.

Thus, the direction unconformity degree F$\theta$ and the location unconformity degree Fp of one imaginary route Rijk corresponding to the imaginary locus T can be found. This is repeated in a number of combinations of the imaginary routes. In this embodiment, since the straight roads exist as three sets of every two straight roads R11 and R12, R21 and R22, R32 and R32, the combination of the imaginary routes is provided as eight ways.

Figure 8:
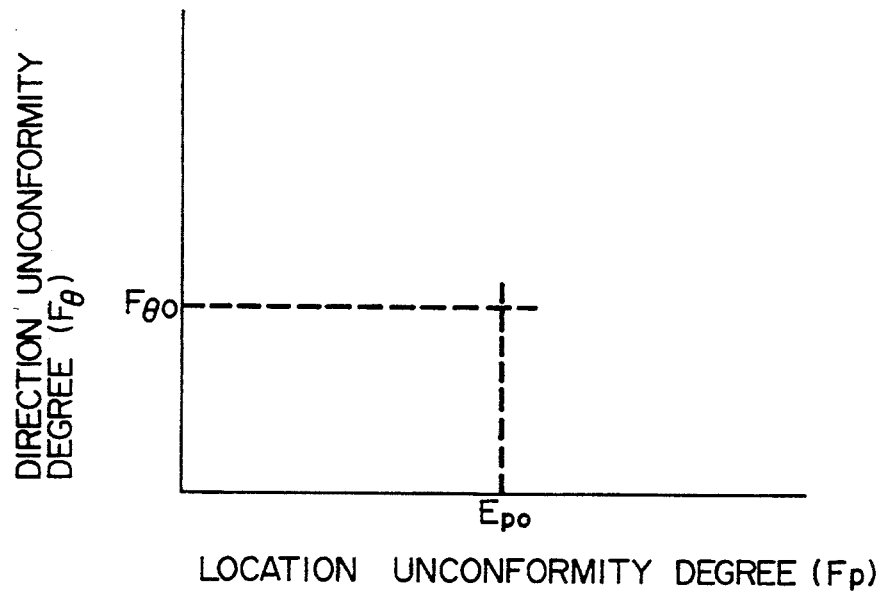
FIG. 8 is a view showing the direction unconformity degree and the location unconformity degree for determining a travel route of the vehicle according to an embodiment of the present invention.

As shown in FIG. 8, if the direction unconformity degree and the location unconformity degree are set as threshold values F$\theta$0 and Fp0, and there is only one imaginary route Rijk within the threshold values, it is judged with a high possibility that the imaginary route Rijk is a travel route to be determined. And, the location-direction rectification means 14 rectifies a vehicle's direction and a vehicle's location by effecting rotation movement of the direction offset $\theta$offijk previously calculated and parallel movement of the location offset Xoffijk, Yoffijk with respect to the estimated direction and the estimated location of the present vehicle. Furthermore, in a case that the condition proceeds over a long distance that there are multiple imaginary routes Rijk having the direction unconformity degree $F\theta ijk$ and the location unconformity degree Rijk lower than the threshold values $F\theta 0$ and Fp0, errors of the vehicle's estimated location and estimated direction are accumulated due to no chance of rectifying the direction and location. Therefore, in such a case, the product of the direction unconformity degree $F\theta ijk$ and direction unconformity degree Fijk is found as new total unconformity degree Fijk, so that the vehicle's location and the vehicle's direction may be rectified by determining as a travel route the imaginary route having a minimum total unconformity degree Fijk lower than a predetermined threshold value F0.

Figure 9:
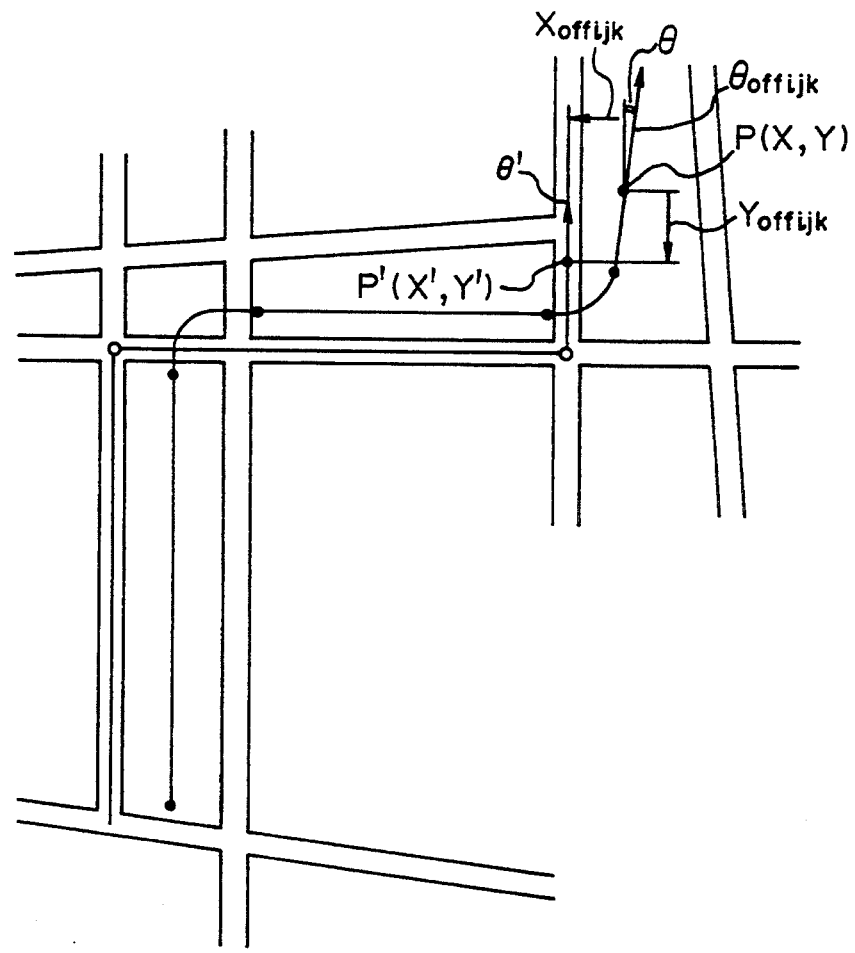
FIG. 9 is a view showing the location rectification and the direction rectification of the vehicle according to the embodiment of the present invention.
Figure 10:
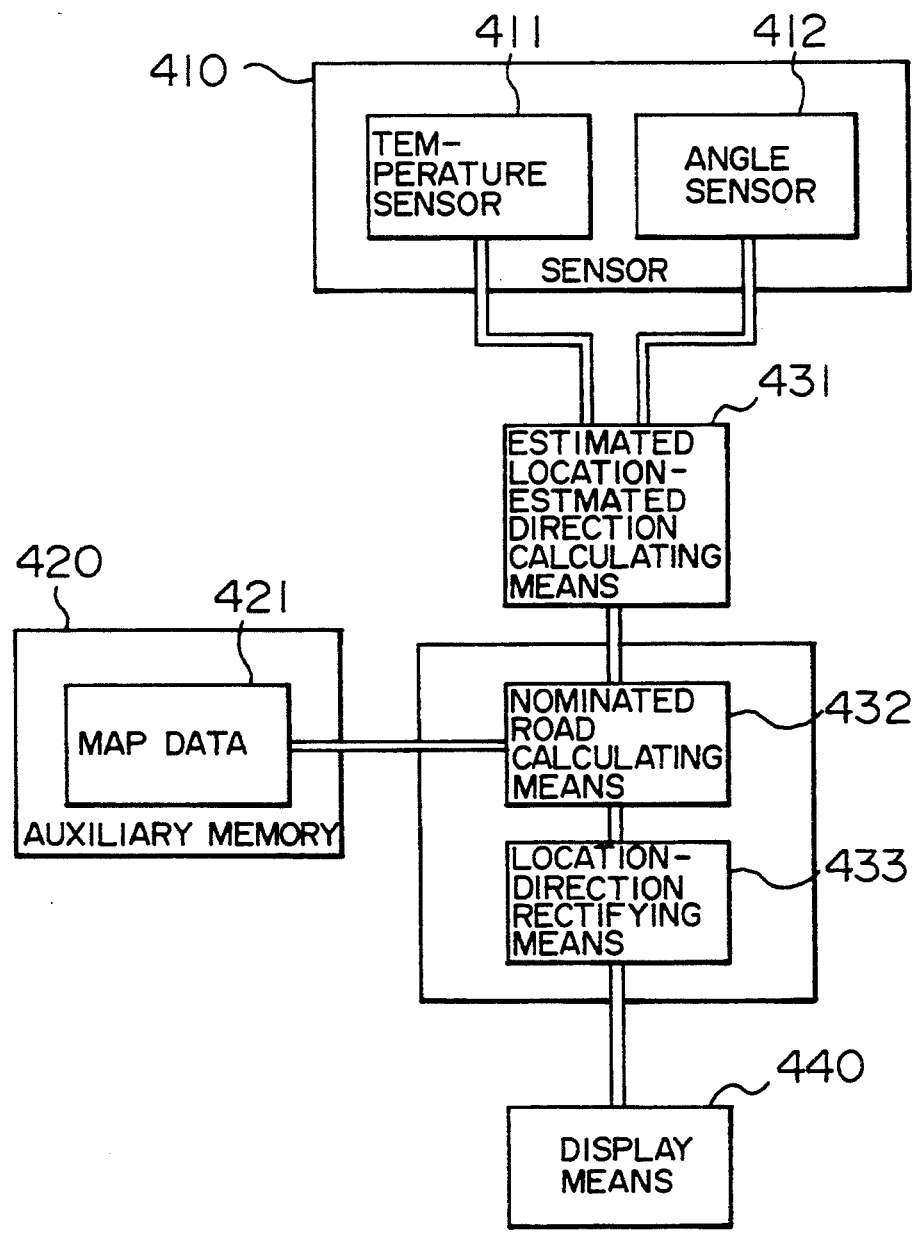
FIG. 10 is a schematic block diagram of a conventional navigation system mounted on a vehicle.
Figure 11:
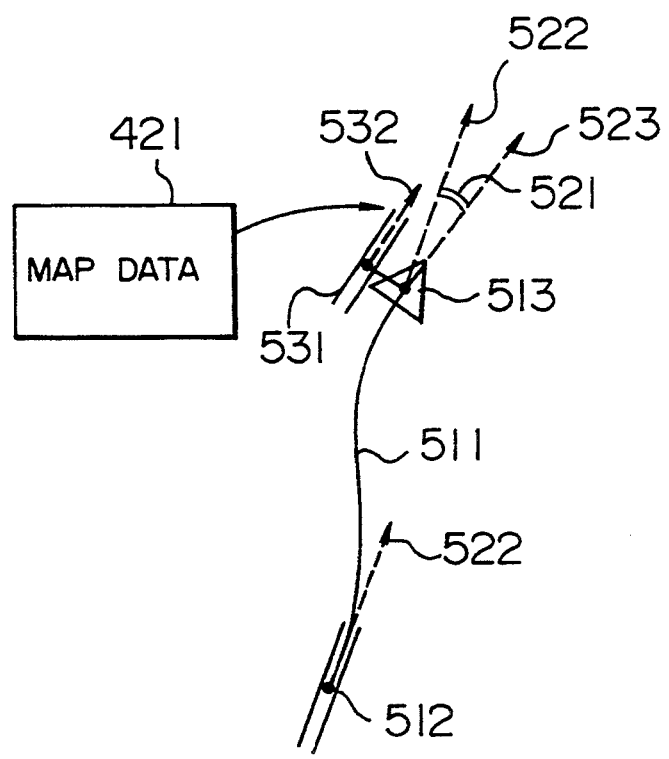
FIG. 11 is an illustration of operation of the conventional navigation system mounted on a vehicle.

Now, as shown in FIG. 9, if an estimated location of the present vehicle is put as P(X, Y), an estimated direction as $\theta$, a direction offset of the imaginary route determined as a travel route as $\theta$offijk, and the location offset as (Xoffijk, Yoffijk), the vehicle location P' (X', Y') and the vehicle direction $\theta$ after the location and direction are rectified are calculated by the following equations. That is:

$$X' = X - Xoffijk$$

$$Y' = Y - Yoffijk$$

$$\theta' = \theta - \theta offijk$$

Finally, the vehicle location-direction display means 15 displays the vehicle's location P' (X', Y') and the vehicle's direction $\theta'$ by putting them on the map data 6, thereby informing the present location and the present direction of the vehicle to an operator of the vehicle.

Thus, according to the above embodiment, the imaginary locus which connects straight travel loci taken out of travel data of a vehicle to each other over a plurality of vectors and the imaginary route which connects straight roads searched from an existence estimated area of the vehicle when the vehicle straightly travels are formed, and the direction offset and the location offset are removed from the imaginary locus and route to find the direction unconformity degree and the location unconformity degree, thereby allowing the locus and route to be compared in patterns those of with each other over a long distance. Therefore, it is possible to find with a high probability a correct travel route even if the vehicle travels in an area of roads concentrating such as an urban district.

Accordingly, the present location and the present direction of the vehicle never fails to be located, thus preventing the vehicle from travelling astray. Further, the travel route is determined by the result of comparison between the patterns of a plurality of vectors, and even when the road map data is partially wrong, the navigation system of the present invention is less affected by such wrong data. Therefore, the present location and the present direction of the vehicle can be found with a high probability.

What is claimed is:

1. A navigation system adapted to be used with a vehicle, said navigation system comprising:

means for receiving an input of information of said vehicle's movement;

estimated location-direction calculating means, receiving said information of said vehicle's movement, for calculating an estimated vehicle existence location by deriving a vehicle movement vector on the basis of said information of said vehicle's movement and for adding said vehicle movement vector to an already known location and direction of travel of said vehicle;

straight condition processing means, receiving said information of said vehicle's movement, for judging by said information of the vehicle's movement whether or not the vehicle is in a condition of straight travel and for forming at least one straight travel locus when said straight condition processing means judges that said vehicle is in the condition of straight travel, thereby forming an imaginary locus comprising said at least one straight travel locus;

means for receiving an input of map data;

road searching-straightening processing means, receiving said at least one straight travel locus, for extracting from said map data information concerning at least one road which corresponds to said at least one straight travel locus to thereby form an imaginary route comprising said at least one straight road;

direction rectifying data calculating means, receiving said at least one straight travel locus and said imaginary route, for finding a direction offset which is a function of direction errors between said at least one straight travel locus and one of said at least one straight road corresponding to the at least one straight travel locus, and for calculating direction unconformity degree in accordance with direction differences still remaining between said at least one straight travel locus and said corresponding one of said at least one straight road after said direction offset is removed from said imaginary route;

location rectifying data calculating means, receiving said imaginary locus and said imaginary route, for finding a location offset which is a function of location errors of a turning point of said imaginary route with respect to a turning point of said imaginary locus when an intersection of adjacent straight travel loci of said imaginary locus is defined as said turning point of the imaginary locus and an intersection of adjacent straight roads of said imaginary route after directions of said adjacent straight roads have been corrected for said direction offset is defined as said turning point of the imaginary route, and for calculating a location unconformity degree on the basis of a location difference still remaining between said turning point of the imaginary route and said turning point of said imaginary locus after said location offset is removed from said imaginary locus; and location-direction rectifying means for rectifying a location and direction of the vehicle by respectively applying said direction offset and said location offset to an estimated direction and an estimated location in a case of said direction unconformity degree and said location unconformity degree respectively being within predetermined threshold values.

2. A navigation system according to claim 1, further comprising vehicle location-direction displaying means for displaying said vehicle's location and direction rectified by said location-direction rectifying means.

3. A navigation system according to claim 1, wherein said navigation system is mounted on said vehicle.

4. A navigation system according to claim 1, wherein said means for receiving an input of map data comprises means for reading a CD-ROM which stores said map data.

5. A navigation system according to claim 1, wherein said information of said vehicle's movement comprises said vehicle's linear speed and angular velocity.

6. A navigation system according to claim 1, wherein said straight traveling condition processing means comprises straight travel detecting means for detecting when the vehicle is in said condition straight travel and straight travel locus forming means for forming said straight travel locus when said vehicle is in said condition of straight travel.

7. A navigation system according to claim 1, wherein said straight traveling condition processing means comprises straight travel detecting means for detecting when the vehicle is in said condition of straight-travel and straight travel locus forming means for forming said straight travel locus when said vehicle is in said condition of straight travel.

8. A navigation system according to claim 1, wherein said road searching-straightening processing means comprises road searching means for searching the map data to locate a road corresponding to said estimated existence location and straight travel locus forming means for designating as said at least one straight road a road which is parallel to said at least one straight travel locus and connected to the road located by said road searching means.

9. A navigation system according to claim 1, wherein said direction offset is a mean value of direction differences between the at least one straight travel locus and the at least one straight road, and said direction unconformity degree is a mean value of absolute values of direction differences between said at least one straight road and said at least one straight travel locus after the direction offset has been removed from each of said direction differences between said at least one straight road and said at least one straight travel locus.

10. A navigation system according to claim 1, wherein said location offset is a mean value of differences of each X co-ordinate and Y-co-ordinate in the turning point of the imaginary locus and the turning point of the imaginary route, and said location unconformity degree is a mean value of absolute values of location differences in each imaginary route after removing of the location offset.

11. A navigation system adapted to be used with a vehicle, said navigation system comprising:
sensor means for detecting a condition of said vehicle's movement and for producing a sensor output in accordance with said condition of said vehicle's movement;
estimated location-direction calculating means, receiving said sensor output, for calculating an estimated existence location and direction of said vehicle by deriving a vehicle movement vector on the basis of said sensor output and adding said vehicle movement vector to an already known location and direction of travel of said vehicle;
straight travel condition processing means, receiving said sensor output, for judging whether or not said vehicle is in a condition of straight traveling and for forming a straight travel locus when said straight travel condition processing means judges that said vehicle is in the condition of straight travel, thereby forming an imaginary locus;
means for receiving an input of map data;
road searching-straightening processing means, receiving said estimated existence location and direction, for extracting from said map data information concerning at least one road which corresponds to said at least one straight travel locus to thereby form an imaginary route comprising said at least one straight road;
direction rectifying data calculating means, receiving said at least one straight travel locus and said imaginary route, for finding a direction offset which is a function of direction errors between said at least one straight travel locus and one of said at least one straight road corresponding to said at least one straight travel locus, and for calculating direction a unconformity degree in accordance with direction differences still remaining between said at least one straight travel locus and said corresponding one of said at least one straight road after said direction offset is removed from said imaginary route;
location rectifying data calculating means, receiving said imaginary locus and said imaginary route, for finding a location offset which is a function of location errors of a turning point of the imaginary route with respect to a turning point of the imaginary locus when an intersection of adjacent straight travel loci of said imaginary locus is defined as said turning point of the imaginary locus and an intersection of adjacent straight roads of said imaginary route after directions of said adjacent straight roads have been corrected for said direction offset is defined as said turning point of the imaginary route, and for calculating a location unconformity degree on the basis of a location difference still remaining between said turning point of the imaginary and said turning point of said imaginary locus after said location offset is removed from said imaginary locus; and
location-direction rectifying means for rectifying a location and direction of the vehicle by respectively giving a direction of f set and a location offset with respect to an estimated direction and an estimated location in a case of said direction unconformity degree and said location unconformity degree respectively being within a predetermined threshold value.

12. A navigation system according to claim 11, further comprising vehicle location-direction displaying means for displaying said vehicle's location-direction rectified by said location-direction rectifying means.

13. A navigation system according to claim 11, wherein said navigation system is mounted on said vehicle.

14. A navigation system according to claim 11, wherein said means for receiving an input of map data comprises means for reading a CD-ROM which stores said map data.

15. A navigation system according to claim 11, wherein said sensor means comprises means for sensing said vehicle's linear speed and angular velocity.

16. A navigation system according to claim 11, wherein said direction offset is a mean value of direction differences between the at least one straight travel locus and the at least one straight road, and said direction unconformity degree is a mean value of absolute values of direction differences between said at least one straight road and said at least one straight travel locus after the direction offset has been removed from each of said direction differences between said at least one straight road and said at least one straight travel locus.

17. A navigation system according to claim 11, wherein said sensor means includes a velocity sensor for detecting a travel velocity of the vehicle and an angular sensor for detecting a rotation angular velocity of the vehicle, and said sensor output includes location information calculated by said velocity sensor and direction information calculated by said angular velocity sensor.

18. A navigation system according to claim 11, wherein said straight traveling condition processing means comprises straight travel detecting means for detecting when the vehicle is in said condition of straight travel and straight travel locus forming means for forming said straight travel locus when said vehicle is in said condition of straight travel.

19. A navigation system according to claim 11, wherein said road searching-straightening processing means comprises road searching means for searching the map data to locate a road corresponding to said estimated existence location and straight travel locus forming means for designating as said at least one straight road a road which is parallel to said at least one straight travel locus and connected to the road located by said road searching means.

20. A navigation system according to claim 11, wherein said location offset is a mean value of differences of each X-co-ordinate and Y-co-ordinate in the turning point of the supposed locus and the turning point of the imaginary route, and said location unconformity degree is a mean value of absolute values of location differences in each imaginary route after removing of the location offset.

21. A navigation system adapted to be used with a vehicle, said navigation system comprising:

sensor means for detecting a condition of said vehicle's movement and for producing a sensor output in accordance with said condition of said vehicle's movement;

estimated location-direction calculating means, receiving said sensor output, for calculating an estimated existence location of said vehicle on the basis of said sensor output;

straight travel condition processing means, receiving said sensor output, for judging by said sensor output whether or not said vehicle is in a condition of straight traveling and for forming at least one straight travel locus when said straight travel condition processing means judges that said vehicle is in the condition of straight travel, thereby forming an imaginary locus comprising said at least one straight travel locus;

means for storing map data;

road searching-straightening processing means, receiving said at least one straight travel locus, for extracting from said map data information concerning at least one road which corresponds to said at least one straight travel locus to thereby form an imaginary route comprising said at least one straight road;

direction rectifying data calculating means, receiving said at least one straight travel locus and said imaginary route, for finding a direction offset which is a function of direction errors between said at least one straight travel locus and said at least one straight road corresponding to the at least one straight travel locus, and for calculating a direction unconformity degree in accordance with direction differences still remaining between said at least one straight travel locus and said at least one straight road after said direction offset is removed from said imaginary route;

location rectifying data calculating means, receiving said imaginary locus and said imaginary route, for finding a location offset which is a function of location errors of a turning point of the imaginary route with respect to a turning point of the imaginary locus when an intersection of adjacent straight travel loci of said imaginary locus is defined as said turning point of the imaginary locus and an intersection of adjacent straight roads of said imaginary route after directions of said adjacent straight roads have been corrected for said direction offset is defined as said turning point of the imaginary route, and for calculating a location unconformity degree on the basis of a location difference still remaining between said turning point of the imaginary and said turning point of said imaginary locus after said location offset has been removed from said imaginary locus; and location-direction rectifying means for rectifying a location and direction of the vehicle by respectively applying said direction offset and said location offset to an estimated direction and an estimated location in a case of said direction unconformity degree and said location unconformity degree respectively being within predetermined threshold values.

22. A navigation system according to claim 21 further comprising vehicle location-direction displaying means for displaying said vehicle's location-direction rectified by said location-direction rectifying means.

23. A navigation system according to claim 21, wherein said sensor means includes a velocity sensor for detecting a travel velocity of the vehicle and an angular sensor for detecting a rotation angular velocity of the vehicle, and said sensor output includes location information calculated by said velocity sensor and direction information calculated by said angular velocity sensor.

24. A navigation system according to claim 21, wherein said navigation system is mounted on said vehicle.

25. A navigation system according to claims 21, wherein said means for storing map data comprises a CD-ROM which stores said map data and means for reading said CD-ROM.

26. A navigation system according to claim 21, wherein said sensor means comprises means for sensing said vehicle's linear speed and angular velocity.

27. A navigation system according to claim 21, wherein said road searching-straightening processing means comprises road searching means for searching the map data to locate a road corresponding to said estimated existence location and straight travel locus forming means for designating as said at least one straight road a road which is parallel to said at least one straight travel locus and connected to the road located by said road searching means.

28. A navigation system according to claim 21, wherein said direction offset is a mean value of direction differences between the at least one straight travel locus and the at least one straight road, and said direction unconformity degree is a mean value of absolute values of direction differences between said at least one straight road and said at least one straight travel locus after the direction offset has been removed from each of said direction differences between said at least one straight road and said at least one straight travel locus.

29. A navigation system according to claim 21, wherein said location offset is a mean value of differences of each X-co-ordinate and Y-co-ordinate in the turning point of the imaginary locus and the turning point of the imaginary route, and said location unconformity degree is a mean value of absolute values of location differences in each imaginary route after removing of the location offset.

* * * * *